May 12, 1925.  1,537,072

S. O. A. FIEDLER

FEED WATER HEATER

Filed Nov. 22, 1923  2 Sheets-Sheet 2

Sébastien Otto Alfred Fiedler
INVENTOR;

Patented May 12, 1925.

1,537,072

UNITED STATES PATENT OFFICE.

SÉBASTIEN OTTO ALFRED FIEDLER, OF PARIS, FRANCE, ASSIGNOR TO L'AUXILIAIRE DES CHEMINS DE FER ET DE L'INDUSTRIE, OF PARIS, FRANCE.

FEED-WATER HEATER.

Application filed November 22, 1923. Serial No. 676,219.

*To all whom it may concern:*

Be it known that I, SÉBASTIEN OTTO ALFRED FIEDLER, citizen of the French Republic, residing at Paris, in the French Republic, have invented new and useful Improvements in Feed-Water Heaters, of which the following is a specification.

The present invention relates to feed heaters in which the liquid to be heated is mixed directly with the heating fluid or steam (exhaust steam, withdrawn steam, blow-off steam etc.) entering the heater in the state of vapour and whose heat is to be used.

According to one feature of the present invention, the feed heater comprises a plurality of chambers, of which one at least is connected with the atmosphere, and which are connected in sequence to each other, the mixture of the steam and the liquid to be heated, as well as the circulation of this liquid, being ensured by means of differences of pressure or of level within these chambers, and the latter being either separate or combined in a single apparatus.

According to a further feature of this invention, the heating steam is admitted into one of these chambers, which constitutes the mixing chamber, through a suitable regulator, so that the steam pressure in this mixing chamber will remain constant and will balance the weight of a column of the liquid to be heated having a predetermined height, this height being below or equal to the height reached by the liquid in a succeeding chamber which is open to the atmosphere and at the lower part whereof the liquid, when hot and mixed with the steam which it has condensed, is admitted.

In this manner the heating of the liquid may be carried out completely to ebullition, and the pressure prevailing in the mixing chamber may be regulated at will, so that the desired temperature for the liquid may be obtained, and a sufficient space filled with steam may be provided within said mixing chamber in order to dispose therein any known devices for spraying the liquid to be heated and causing the same to flow in the state of very fine particles, while all loss of heating steam is obviated in spite of the fact that heating is effected in an apparatus in communication with the atmosphere.

Another feature of the invention consists in that the discharge of the gases contained in the liquid to be heated is rendered very easy by the fact that the liquid heated in the mixing chamber flows into the next chamber, circulating from bottom to top, and then flows over in the form of a thin sheet which is spread out, falling through a certain height into the succeeding chamber, this spreading out in a sheet and this overflow being carried out by any suitable means according to the circumstances.

Other features of the invention will be set forth in the following description.

In the appended drawings which show by way of example two constructions of the heater according to the invention:

Figure 1:
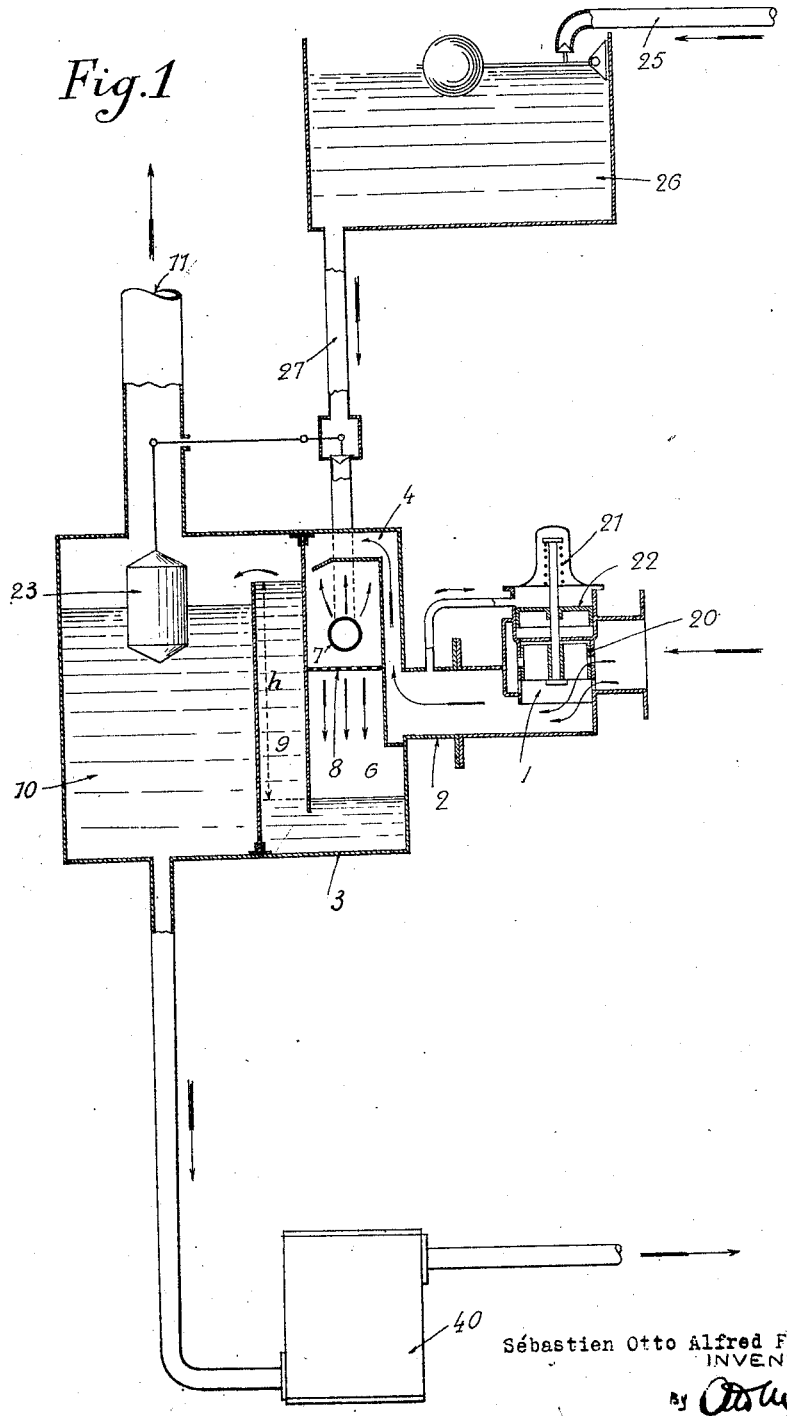
Fig. 1 is a diagram of a heating plant comprising a first construction of the heater, in the case in which the liquid to be heated enters the heater merely by gravity.

As observed in the drawing, in both cases, the steam entering the heater 3 is admitted through the intermediary of a regulator 1 of a known type, placed upon the steam inlet pipe 2. This regulator consists of a valve 20, the weight whereof is balanced by a spring 21 tending to hold it open, and controlled by a piston 22 which is submitted to the pressure of the heating steam; this piston acts in the contrary direction to the spring, so that when the steam pressure increases the valve is lowered and narrows the steam inlet orifice, whilst the valve rises and increases the size of said orifice when the pressure becomes reduced, in such manner that the rate of pressure in the mixing chamber 6 of the heater is kept constant.

The heater itself is, in the example shown in Fig. 1, divided by partitions of suitable height into four chambers 4, 6, 9 and 10 which successively communicate with each other.

The chamber 4 or steam admission chamber is connected at one end with the regulator 1 and at the other end with the chamber 6. A pipe 7, either horizontal or vertical, extends through the chamber 6, or mixing chamber, and brings the liquid to be heated, this tube being perforated in a suitable manner so that the issuing liquid will be divided into substantially vertical streams. The chamber 6 is also divided near its middle part by a perforated plate 8 placed horizontally, and is connected at the lower part with the chamber 9.

The chamber 9 or intermediate chamber in which the heated liquid reaches a constant level, communicates at the upper part with the chamber 10, and also with the atmosphere through the pipe 11.

The chamber 10 into which flows the heated liquid, is also connected with the atmosphere through the same pipe 11 and is so disposed that the level of the liquid in this chamber 10 will be constant and below the level attained by the liquid in the chamber 9 at the time when it flows into the chamber 10.

In Fig. 1, the liquid to be heated enters the heater by gravity through the pipe 25, the relay tank 26 and the pipe 27 which is prolonged by the pipe 7. In this case the chamber 10 is provided with a float 23 for stopping the inlet of the liquid from the feed tank to the heater when the liquid in the chamber 10 reaches the predetermined level.

When on the contrary the liquid to be heated is brought into the heater by means of a pump 30, (Fig. 2), the chamber 10 is divided into two chambers 10 and 12, the latter receiving the overflow from the chamber 10 and being so disposed that the level of the liquid in the chamber 10 shall be always below the level of the liquid in the chamber 9 from which the liquid falls into said chamber 9.

Further, the chamber 12 is connected with a receptacle 13 or suction vessel placed upon the pipe 14 connecting the feed tank 15 with the inlet 16 of the pump 30, this receptacle 13 being placed at a level lower than the bottom of the tank 15 and being so disposed that the pipe 17 connecting it with the chamber 12, as well as the pipe 14 which connects it with the tank 15 open at its upper part, whilst the pipe 18 leading to the inlet of the pump open at the lower part of the receptacle 13.

Figure 2:
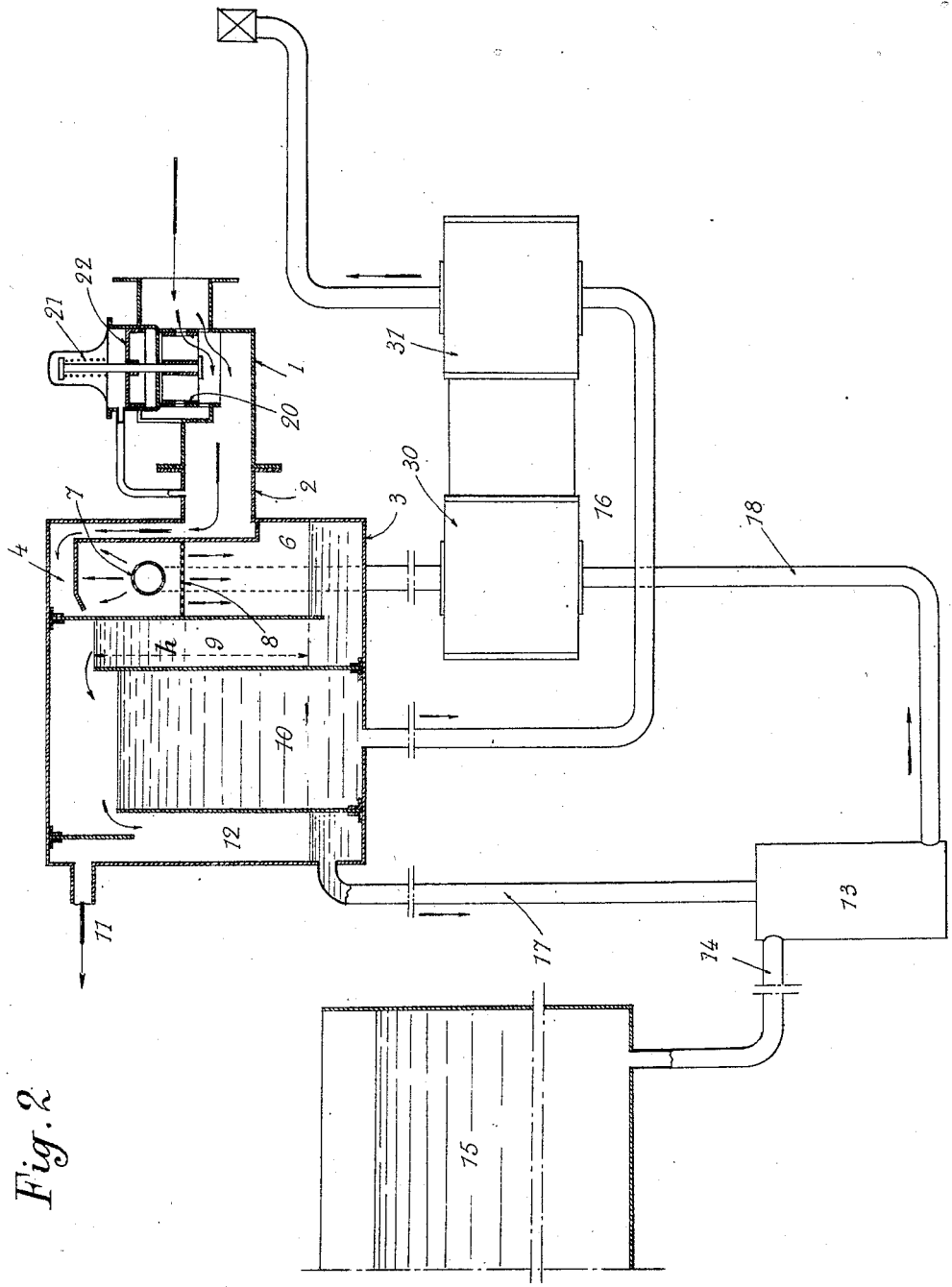
Fig. 2 is a diagram of another heating plant comprising a second construction of the heater, in the case in which the liquid to be heated is delivered to the heater by a pump.

Moreover, in the case of Fig. 1, the heated liquid discharged from the last chamber 10 of the heater is sent by the pump 40 to the apparatus utilizing the liquid. In the case of Fig. 2 the heated liquid leaving the chamber 10, which is the next to the last chamber of the heater, is discharged by a pump 31, operated for example in tandem with the pump 30 which brings the liquid to be heated into the heater. The capacity of the pump 30 is equal to or greater than that of the pump 31.

The operation of the heater according to the invention is as follows:

The steam is sent through the regulator 1 and the conduit 2 into the chamber 4 and then into 6, and is mixed in the latter with the liquid which issues in vertical streams from the orifices of the pipe 7 and is atomized against the sheet metal wall dividing the chamber 4 from the chamber 6, falling thence in a shower through the holes in the plate 8 while completing the condensation of the steam.

The liquid which has been heated and mixed with the steam will then rise into the chamber 9, and the steam pressure in the chamber 6 is regulated to a value equal to the difference of level $h$ and such that the level of the liquid in the chamber 6 shall always be much below the level of the perforated plate 8. The mixture of the heated liquid and condensed vapour rising in the chamber 9, pours in a sheet over the edge of the partition between the chamber 9 and the chamber 10, and falls into the latter through a height equal to the difference of level set up, either by means of the float or by means of the chamber 12, between the levels which the liquids can respectively attain in the chambers 9 and 10.

The upward movement of the liquid in the chamber 9 facilitates the evacuation of the gases dissolved in the liquid entering the heater and which are freed when the temperature of the liquid rises, and the discharge of said gases is completed when the liquid spreads out and falls by flowing over into the chamber 10.

These gases escape into the atmosphere through the conduit 11.

By the use of the vessel 13 placed below the feed tank, all entrance of air and all possibility of unpriming of the pump 30 is obviated, and this allows also for some lack of synchronism between the two pumps.

The fact that the end of the pipe bringing the liquid from the tank 15, as well as that of the pipe 17 open at the top of the vessel 13, whilst the outlet orifice to the pump 30 is placed at the lower part of the vessel 13, serves to ensure the discharge of the liquid which may be contained in the chamber 12, while preventing the suction of the pump from acting preferably upon the inlet of the liquid from the feed tank, which might cause the clogging up of the chamber 12 and hence the suppression of the difference of height between the level of the liquid in the chamber 10 and in the chamber 9.

The above described apparatus are particularly adapted for heating feed water, but may obviously be employed for heating any other kind of liquids.

Having now described my invention what I claim as new and desire to secure by Letters Patent is:

1. A feed water heater with steam in contact comprising a plurality of chambers successively connected to each other and through which the liquid is caused to flow, a number of said chambers being in communication with the atmosphere, and a regulator for admission of the heating steam into one mixing chamber preceding the first chamber in communication with the atmosphere, said regulator being adapted to maintain in said mixing chamber a constant steam pressure corresponding to the height of the column of hot liquid within said first chamber in communication with the atmosphere.

2. A feed water heater with steam in contact comprising a mixing chamber, a number of successive chambers in communication with the atmosphere and connected with said mixing chamber, means whereby the hot liquid discharged from said mixing chamber is caused to flow upwards in the first chamber in communication with the atmosphere and to fall in the form of a wide and thin sheet in an overflow chamber following said first chamber, means for maintaining in said overflow chamber a constant level below the level of the liquid in said first chamber in communication with the atmosphere and a regulator for admission of the heating steam into said mixing chamber and adapted to maintain in the same a constant steam pressure corresponding to the height of the column of hot liquid within said first chamber in communication with the atmosphere.

3. A feed water heater with steam in contact comprising a mixing chamber, a number of successive chambers in communication with the atmosphere and connected with said mixing chamber, means whereby the hot liquid discharged from said mixing chamber is caused to flow upwards in the first chamber in communication with the atmosphere and to fall in the form of a wide and thin sheet in an overflow chamber following said first chamber, an end chamber in communication with said overflow chamber at a determined level, a feed tank, a pump for feeding the liquid to be heated from said feed tank to said mixing chamber, a pipe connecting said end chamber to the suction pipe of said pump and a regulator for admission of the heating steam into said mixing chamber and adapted to maintain in the same a constant steam pressure corresponding to the height of the column of hot liquid within said first chamber in communication with the atmosphere.

In testimony whereof I have signed my name to this specification.

SÉBASTIEN OTTO ALFRED FIEDLER.